US009260187B2

(12) United States Patent
Puricelli

(10) Patent No.: US 9,260,187 B2
(45) Date of Patent: Feb. 16, 2016

(54) ROTOR ASSEMBLY FOR AN AIRCRAFT CAPABLE OF HOVERING AND EQUIPPED WITH AN IMPROVED CONSTRAINT ASSEMBLY

(71) Applicant: AGUSTAWESTLAND S.p.A., Samarate (IT)

(72) Inventor: Giovanni Puricelli, Samarate (IT)

(73) Assignee: AGUSTAWESTLAND S.P.A., Samarate (IT)

( * ) Notice: Subject to any disclaimer, the term of this patent is extended or adjusted under 35 U.S.C. 154(b) by 431 days.

(21) Appl. No.: 13/924,987

(22) Filed: Jun. 24, 2013

(65) Prior Publication Data

US 2014/0093374 A1    Apr. 3, 2014

(30) Foreign Application Priority Data

Jun. 27, 2012  (EP) .................................... 12173958

(51) Int. Cl.
*B64C 27/605*   (2006.01)
*B64C 27/32*   (2006.01)

(52) U.S. Cl.
CPC ............... *B64C 27/605* (2013.01); *B64C 27/32* (2013.01)

(58) Field of Classification Search
CPC ...... B64C 27/12; B64C 27/605; B64C 27/625
See application file for complete search history.

(56) References Cited

U.S. PATENT DOCUMENTS

| 6,280,141 | B1 | 8/2001 | Rampal et al. | |
|---|---|---|---|---|
| 2008/0253891 | A1* | 10/2008 | Cabrera | B64C 27/10 416/134 A |
| 2012/0230824 | A1* | 9/2012 | Muren | A63H 27/12 416/148 |

FOREIGN PATENT DOCUMENTS

| DE | 19630665 | 2/1998 |
|---|---|---|
| FR | 2917709 | 12/2008 |
| WO | WO 2007/044374 | 4/2007 |
| WO | WO 2011/058447 | 5/2011 |

* cited by examiner

*Primary Examiner* — Igor Kershteyn
(74) *Attorney, Agent, or Firm* — Leason Ellis LLP

(57) ABSTRACT

A constraint assembly for an aircraft, having a first member; a second member mounted to translate along and rotate about its own axis; and connecting means for connecting the first and second member, to prevent rotation of the second member about the axis with respect to the first member; the connecting means having a retaining arm, which projects outwards from one of the first and second member, and extends at a distance of other than zero from the axis; and an antirotation bracket, which projects from the other of the first and second member, extends at a distance of other than zero from the axis, and defines a through opening engaged in sliding manner by the retaining arm.

8 Claims, 8 Drawing Sheets

ROTOR ASSEMBLY FOR AN AIRCRAFT CAPABLE OF HOVERING AND EQUIPPED WITH AN IMPROVED CONSTRAINT ASSEMBLY

The present invention relates to a rotor assembly for an aircraft capable of hovering, such as a helicopter or convertiplane, and equipped with an improved constraint assembly.

In the following description and attached drawings, reference is made, purely by way of a non-limiting example, to a helicopter rotor assembly.

FIG. 8 shows a section, with parts removed for clarity, of one example of a known helicopter rotor assembly, indicated as a whole by 100.

BACKGROUND OF THE INVENTION

In known helicopter rotor assemblies, and particularly rotor assembly 100, cyclic and collective pitch are normally controlled by an oscillating-plate control device 101 substantially comprising two concentric rings 102, 103. The outer ring 102, i.e. the one radially outermost with respect to the central axis A, is supported for rotation, on bearings 104, by the inner ring 103, and is connected angularly to a drive shaft 105 to rotate a number of pitch-change rods 107, each hinged eccentrically to a respective blade (not shown in FIG. 8).

The inner ring 103 is fitted coaxially to a substantially sleeve-like movable member 110, in turn mounted to slide axially on a fixed pylon 108, through which the drive shaft 105 extends in axially-fixed, rotary manner.

Movable member 110 is bounded by a spherical annular outer surface 111, which engages a spherical seat 112 on inner ring 103; and inner ring 103 is normally locked angularly to spherical annular outer surface 111 of movable member 110 to oscillate in any direction with respect to movable member 110 about the centre of outer surface 111.

Control device 101 also comprises a number of hydraulic actuators 113 equally spaced about and extending substantially parallel to drive shaft 105, and which exert thrust on inner ring 103 to jointly move inner ring 103, outer ring 102 and movable member 110 axially with respect to pylon 108, and to oscillate rings 102 and 103 with respect to movable member 110 about axes substantially perpendicular to axis A of drive shaft 105.

Movable member 110 is connected to pylon 108 by a compass-type connecting device 114 for preventing rotation of movable member 110 about axis A with respect to pylon 108.

More specifically, connecting device 114 substantially comprises a bracket 116 projecting outwards from pylon 108; a first connecting rod 117 hinged at one end to bracket 116; and a second connecting rod 119 hinged at one end to movable member 110, and at the other end to the end of connecting rod 117 opposite the end connected to bracket 116.

Connecting device 114, pylon 108, and movable member 110 together define a constraint assembly 140 of helicopter rotor assembly 100.

Other examples of known helicopter compass connecting devices are illustrated in EP-A-1031509 and FR 2,771,708.

Though functionally valid, compass connecting devices such as 114 are fairly complex (comprising three hinged parts), are relatively heavy and expensive, and call for constant lubrication and inspection, by being subjected in use to alternating loads which tend to increase slack between connecting rods 117 and 119.

Moreover, to conform with aircraft design redundancy requirements, the number of such connecting devices must be doubled, thus further compounding the above drawbacks.

SUMMARY OF THE INVENTION

It is an object of the present invention to provide a rotor assembly for an aircraft capable of hovering, designed to eliminate the above drawbacks typically associated with known rotor assemblies and including a constraint assembly, which is cheap, reliable and lightweight, and employs fewer component parts than the known constraint assemblies described above.

According to the present invention, there is provided a rotor assembly, for an aircraft capable of hovering.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
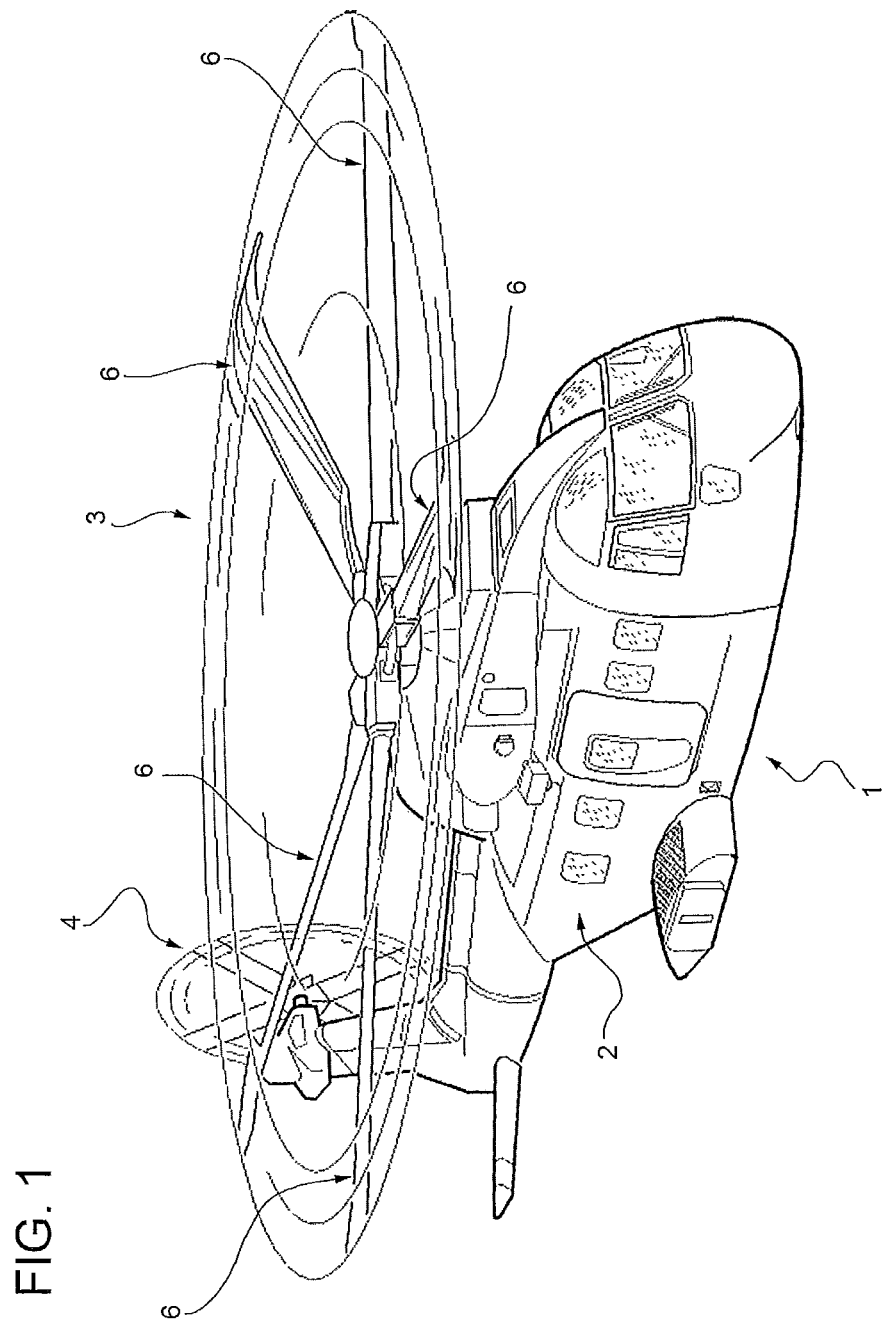
FIG. 1 shows a view in perspective of a helicopter in accordance with the teachings of the present invention.

Number 1 in FIG. 1 indicates as a whole an aircraft capable of hovering—in the example shown, a helicopter.

Helicopter 1 substantially comprises a fuselage 2; a main rotor 3 mounted for rotation on the top of fuselage 2 to sustain helicopter 1 as a whole; and a tail rotor 4 fitted to the rear end of fuselage 2 and rotating in a plane crosswise to that of rotor 3 to counteract the torque generated on fuselage 2 by rotor 3.

Figure 2:
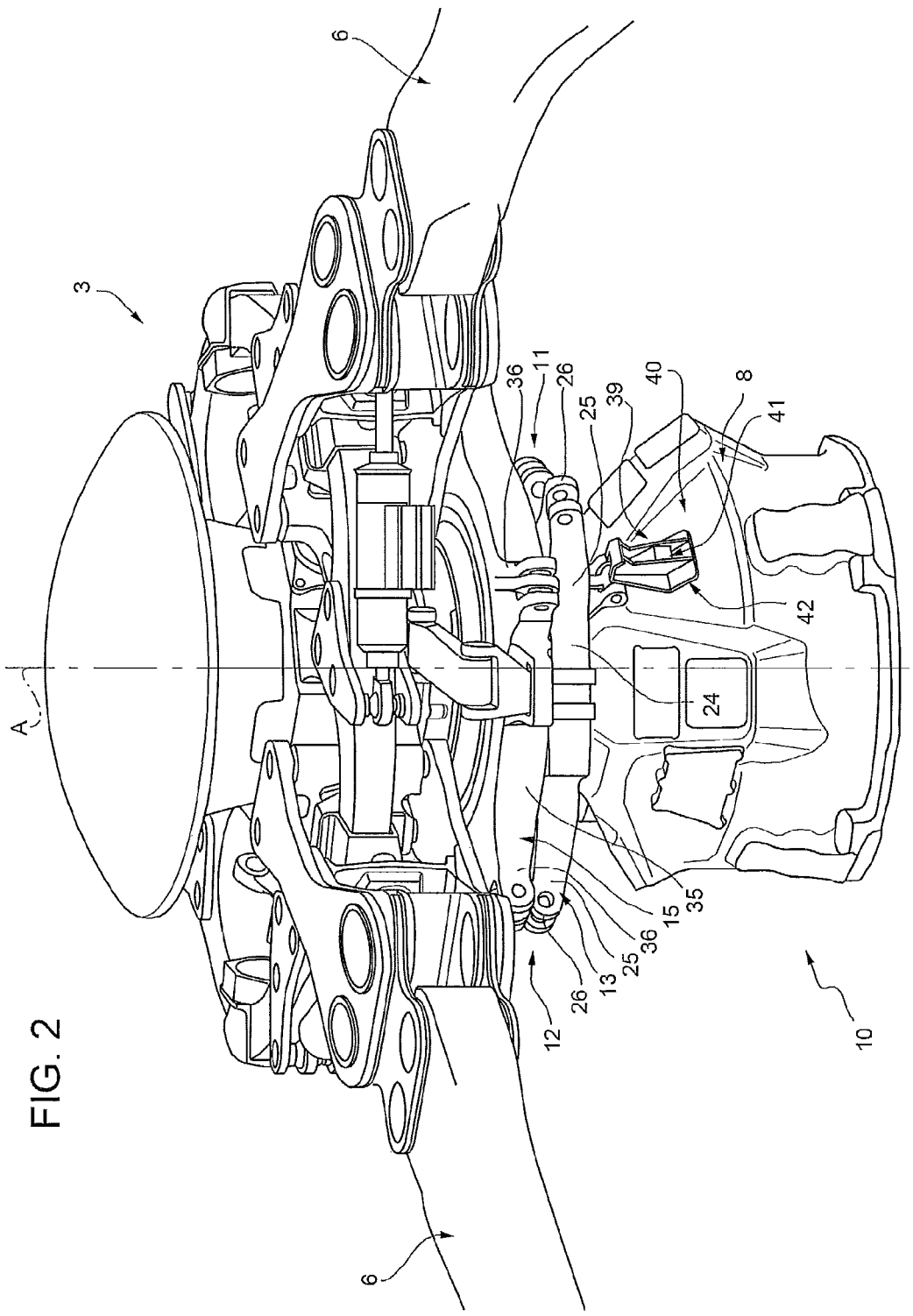
FIG. 2 shows a larger-scale view in perspective of a rotor assembly and constraint assembly of the FIG. 1 helicopter.
Figure 3:
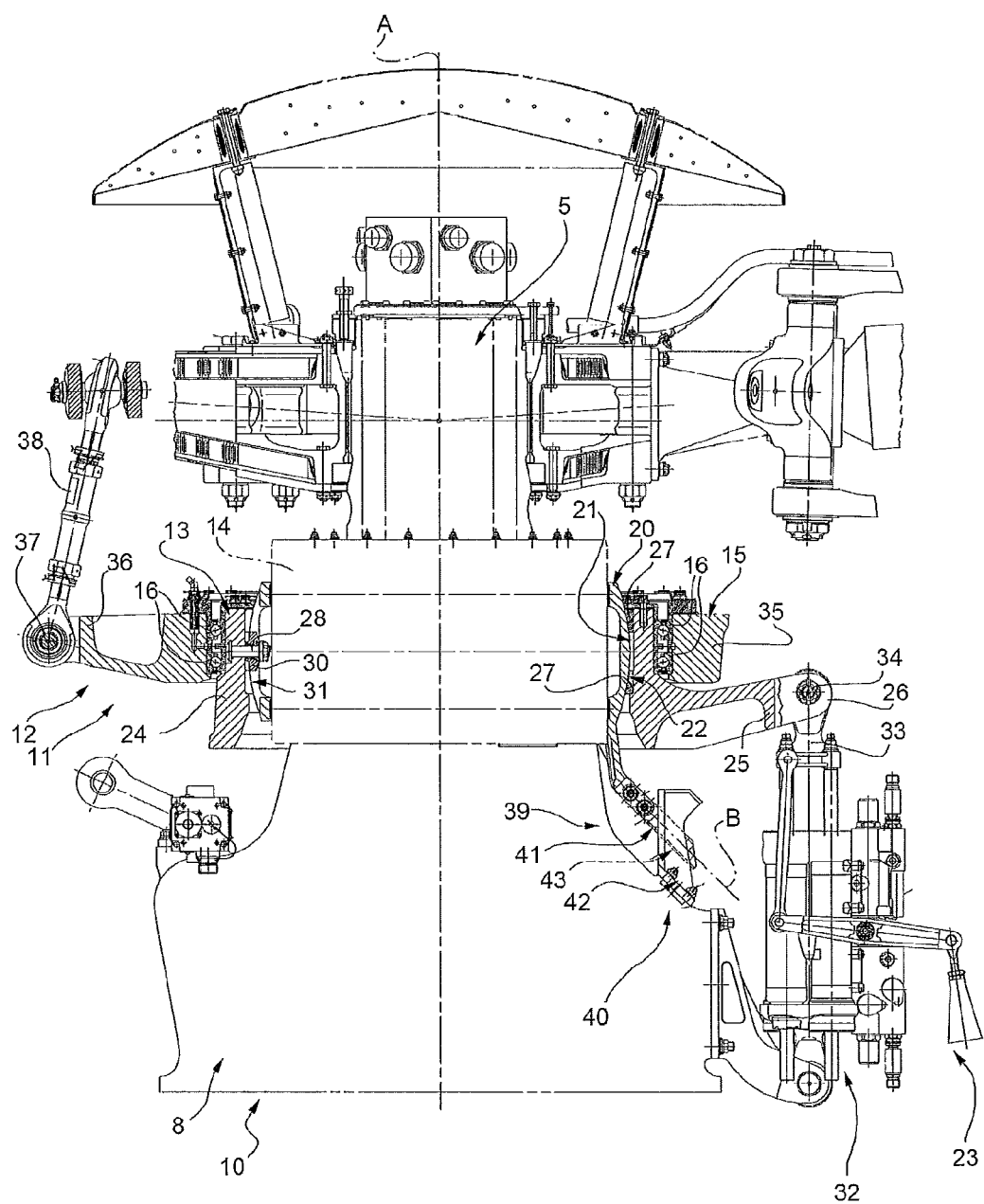
FIG. 3 shows a larger-scale axial section, with parts removed for clarity, of the FIG. 2 rotor assembly and constraint assembly.

With reference to FIGS. 1-3, rotor 3 substantially comprises a drive shaft 5 of axis A, and a number of blades 6 connected in known manner to the top end of drive shaft 5, and projects from the top of a fixed housing or pylon 8 fitted in known manner (not shown) to fuselage 2. More specifically, drive shaft 5 is supported inside housing 8 by means of bearings (not shown) to rotate about axis A, extends substantially vertically, and projects outwards through an end opening in housing 8.

Rotor 3 and housing 8 together define a rotor assembly 10 in accordance with the teachings of the present invention.

Housing 8 is substantially bell-shaped, of axis A, and houses in known manner a motor reducer assembly (not shown) with an output member connected to the bottom end of drive shaft 5.

Figure 7:
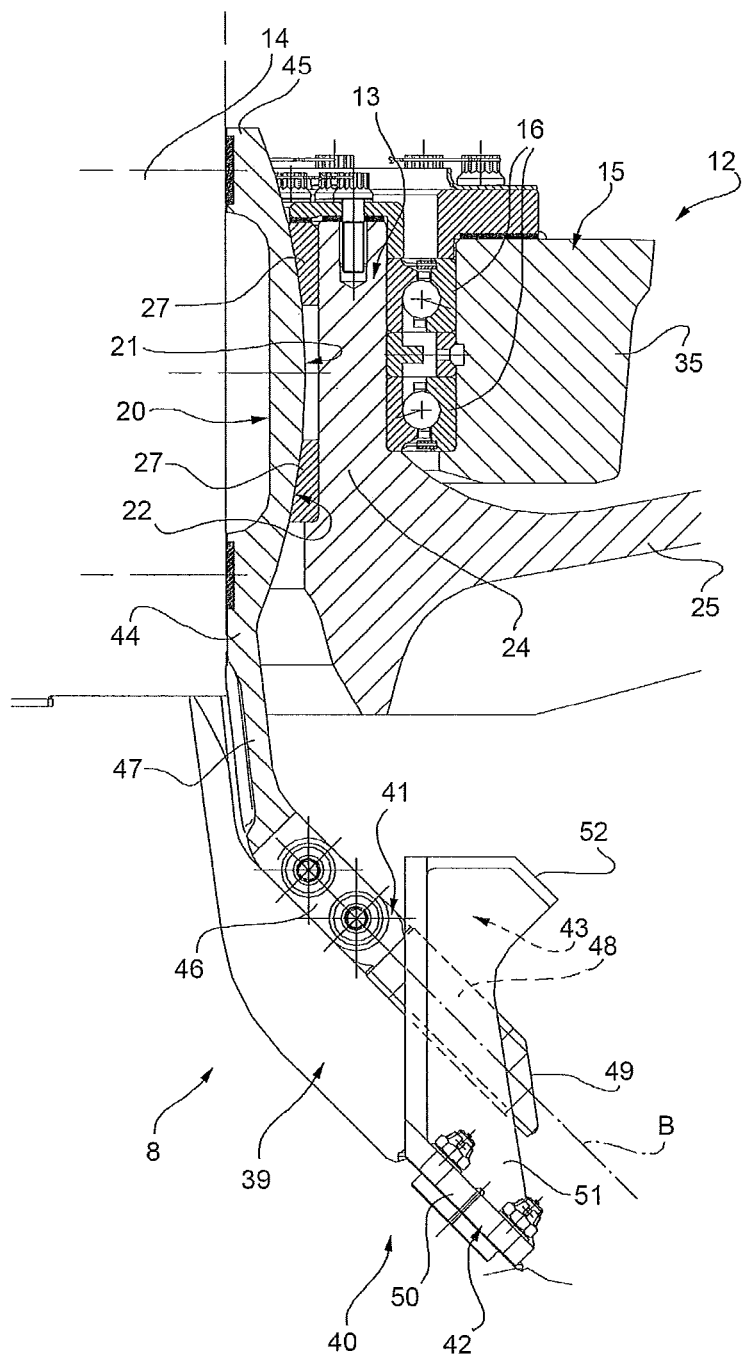
FIG. 7 shows a larger-scale detail of the FIG. 3 section.
Figure 8:
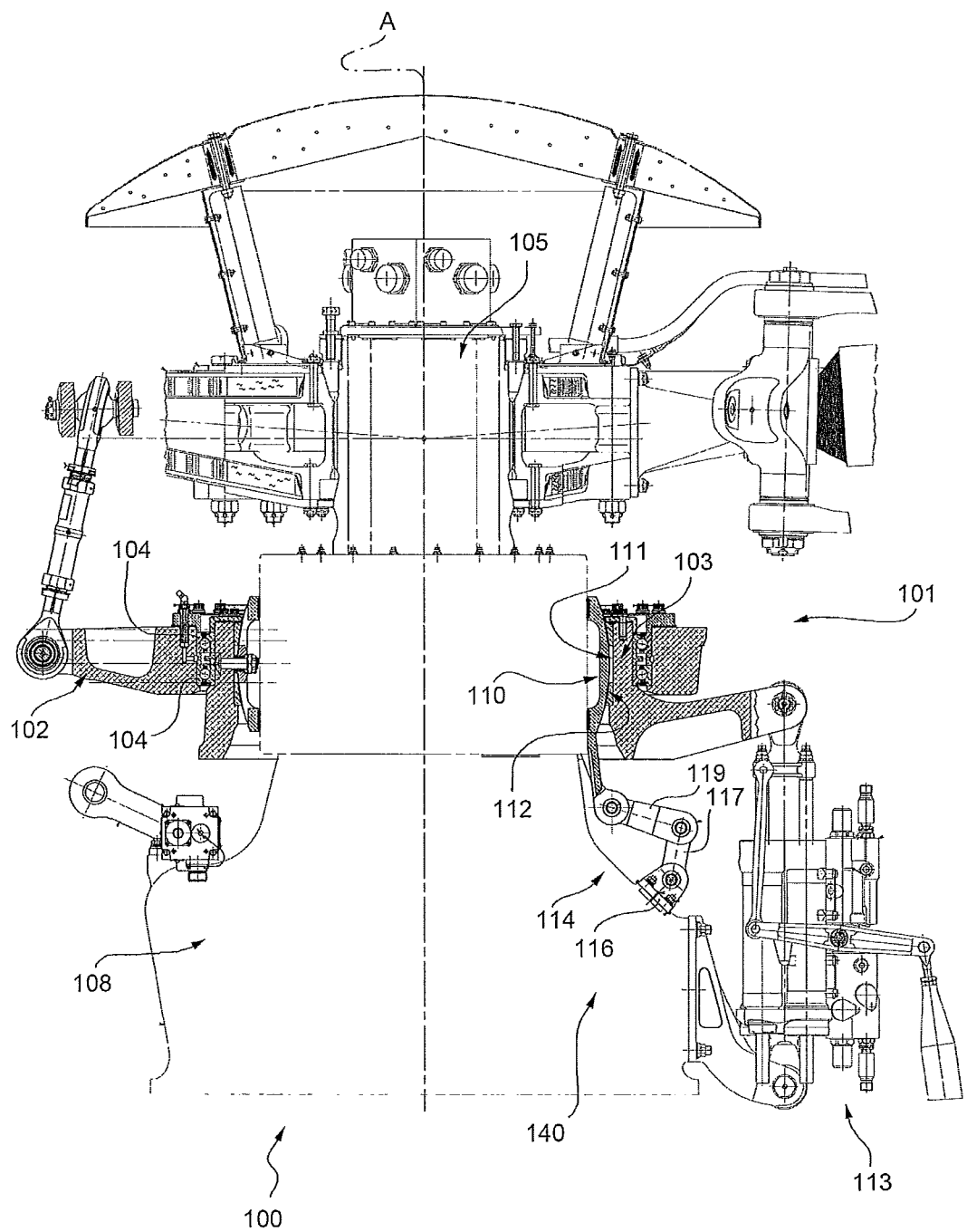
FIG. 8 shows the same axial section as in FIG. 3, with parts removed for clarity, of a known helicopter rotor assembly and constraint assembly.

With particular reference to FIGS. 2, 3 and 7, housing 8 is fitted on the outside with a cyclic and collective pitch control device connected in known manner to blades 6 of rotor 3 and indicated as a whole by 11.

Device 11 substantially comprises an oscillating-plate assembly 12, of axis A, in turn comprising a first annular member 13 fitted in angularly fixed manner about a substantially cylindrical top portion 14 of housing 8, and a second annular member 15 fitted in rotary manner to annular member 13 with the interposition of two bearings 16, and angularly integral with drive shaft 5 in known manner not shown.

Assembly 12 is fitted to a substantially sleeve-like movable member 20, of axis A, mounted so as to be able to slide axially on top portion 14 of housing 8. More specifically, movable member 20 is bounded externally by a spherical annular surface 21—hereinafter referred to simply as 'spherical surface'—which engages a central spherical seat 22 on annular member 13 to allow assembly 12 to oscillate about axes perpendicular to axis A.

Device 11 also comprises a supporting and actuating assembly 23 (FIG. 3) interposed between housing 8 and annular member 13, and which cooperates with annular member 13 to move assembly 12, together with movable member 20, along axis A with respect to top portion 14 of housing 8, and to oscillate assembly 12, as stated, with respect to movable member 20 and portion 14.

With particular reference to FIGS. 3 and 7, annular member 13 comprises a main portion 24, of axis A, from a bottom end portion of which extend radially outwards a number of arms 25 (only one shown) equally spaced angularly about axis A and terminating with respective fork-shaped end portions 26 for connection to supporting and actuating assembly 23.

Main portion 24 of annular member 13 is fitted to spherical surface 21 of movable member 20 with the interposition of two rings 27, of axis A, which are located on opposite sides of an intermediate plane of movable member 20 perpendicular to axis A and through the centre of spherical surface 21, and the radially inner spherical annular surfaces of which define seat 22. Respective layers of antifriction material, preferably Teflon, are interposed between rings 27 and spherical surface 21 of movable member 20.

Annular member 13 is also secured in known manner to movable member 20 by two bolts 28, which are located on diametrically opposite sides of axis A, are fitted through respective radial holes in main portion 24, and each engage a respective key 30, in turn engaging in sliding manner a respective substantially vertical slot 31 formed on the outside of movable member 20. In this way, annular member 13 is locked angularly to spherical surface 21 of movable member 20, and, by means of key 30 and slot 31, can oscillate in any direction with respect to movable member 20 about the centre of spherical surface 21.

Supporting and actuating assembly 23 comprises a number of hydraulic actuators 32 (only one shown partly), which have axes parallel to axis A, are equally spaced about axis A, and have respective output rods 33, each connected at its top end to a fork-shaped end portion 26 of a respective arm 25 of annular member 13 by a ball joint 34.

With reference to FIG. 3, annular member 15 comprises a main portion 35 fitted radially outwards to main portion 24 of annular member 13 with the interposition of bearings 16; and a number of arms 36 equal in number to blades 6 of rotor 3, and which extend radially outwards from main portion 35, and are each connected by a ball joint 37 to the bottom end of a respective pitch control rod 38, the top end of which is connected eccentrically, in known manner not shown, to a respective blade 6 of rotor 3.

With reference to FIGS. 2-7, movable member 20 is connected to housing by a connecting device 39 for preventing rotation of movable member 20 about axis A and with respect to housing 8.

Connecting device 39, housing 8, and movable member 20 define a constraint assembly 40 of rotor assembly 10 of helicopter 1.

An important feature of the present invention is that connecting device 39 comprises a retaining arm 41 projecting outwards from movable member 20 and extending at a distance of other than zero from axis A; and an antirotation bracket 42, which projects from housing 8, also extends at a distance of other than zero from axis A, and defines a through opening 43 engaged in sliding manner by retaining arm 41.

With particular reference to FIGS. 4-7, retaining arm 41 fully extends in a longitudinal direction B sloping with respect to axis A, and slides inside opening 43 in antirotation bracket 42 in a movement parallel to axis A.

Figure 4:
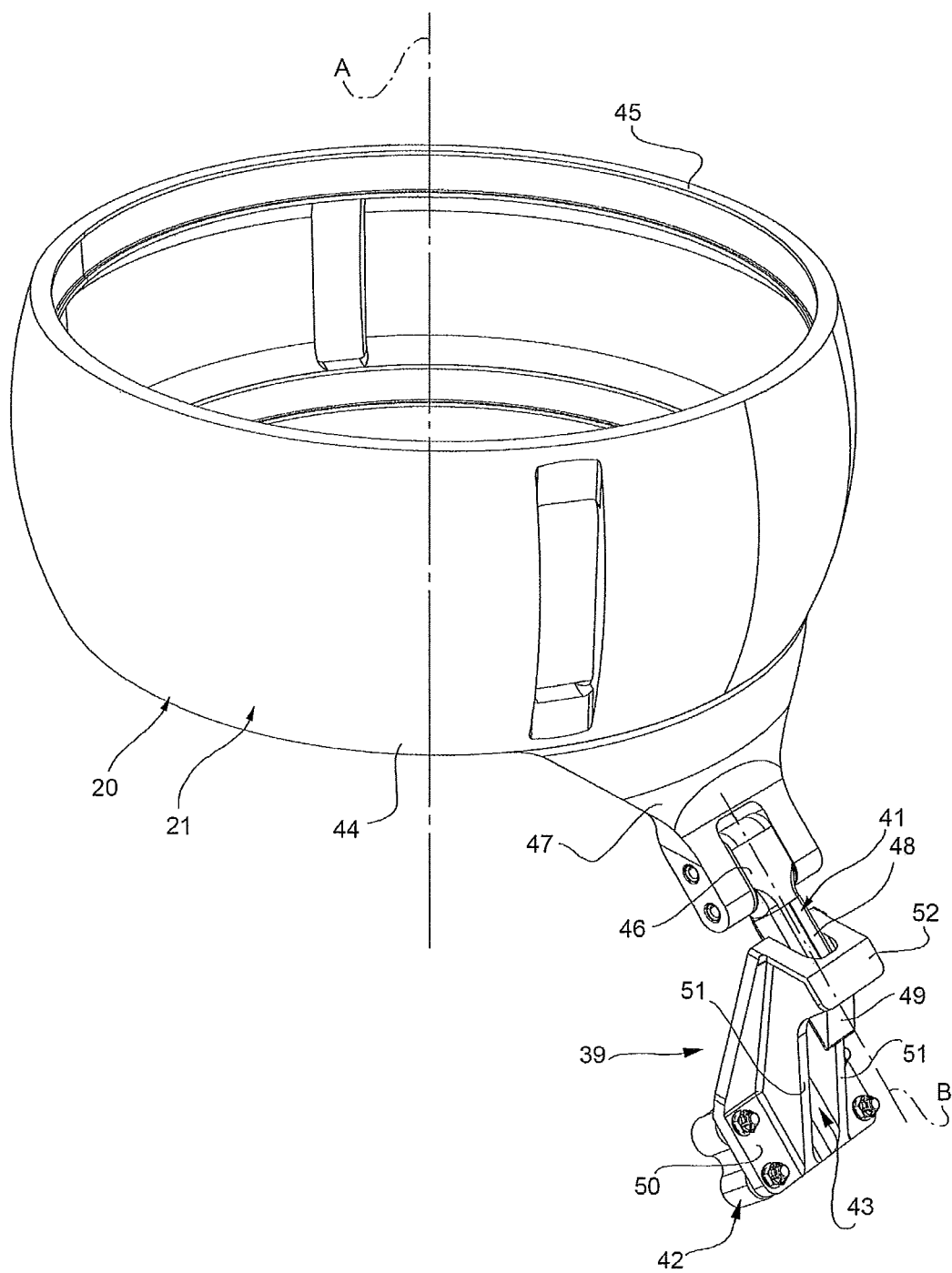
FIG. 4 shows a larger-scale view in perspective, with parts removed for clarity, of the constraint assembly according to the present invention.
Figure 5:
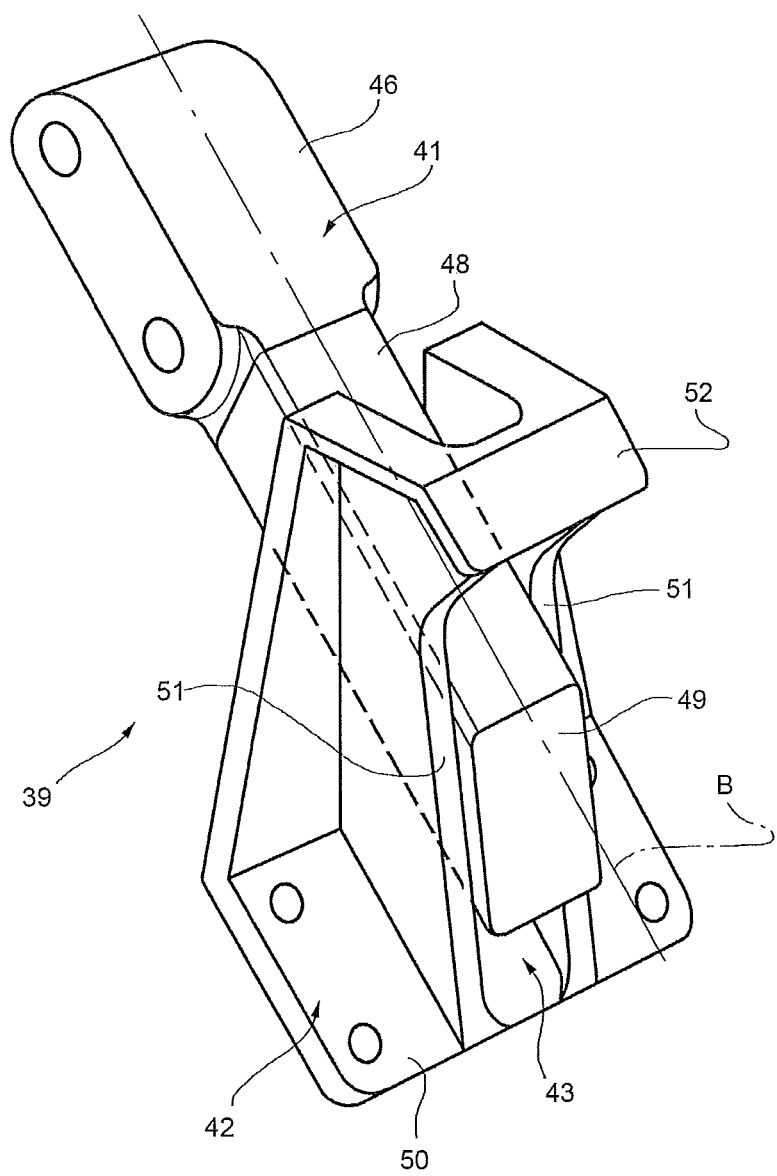
FIG. 5 shows a larger-scale view in perspective of a detail of the FIG. 4 constraint assembly.
Figure 6:
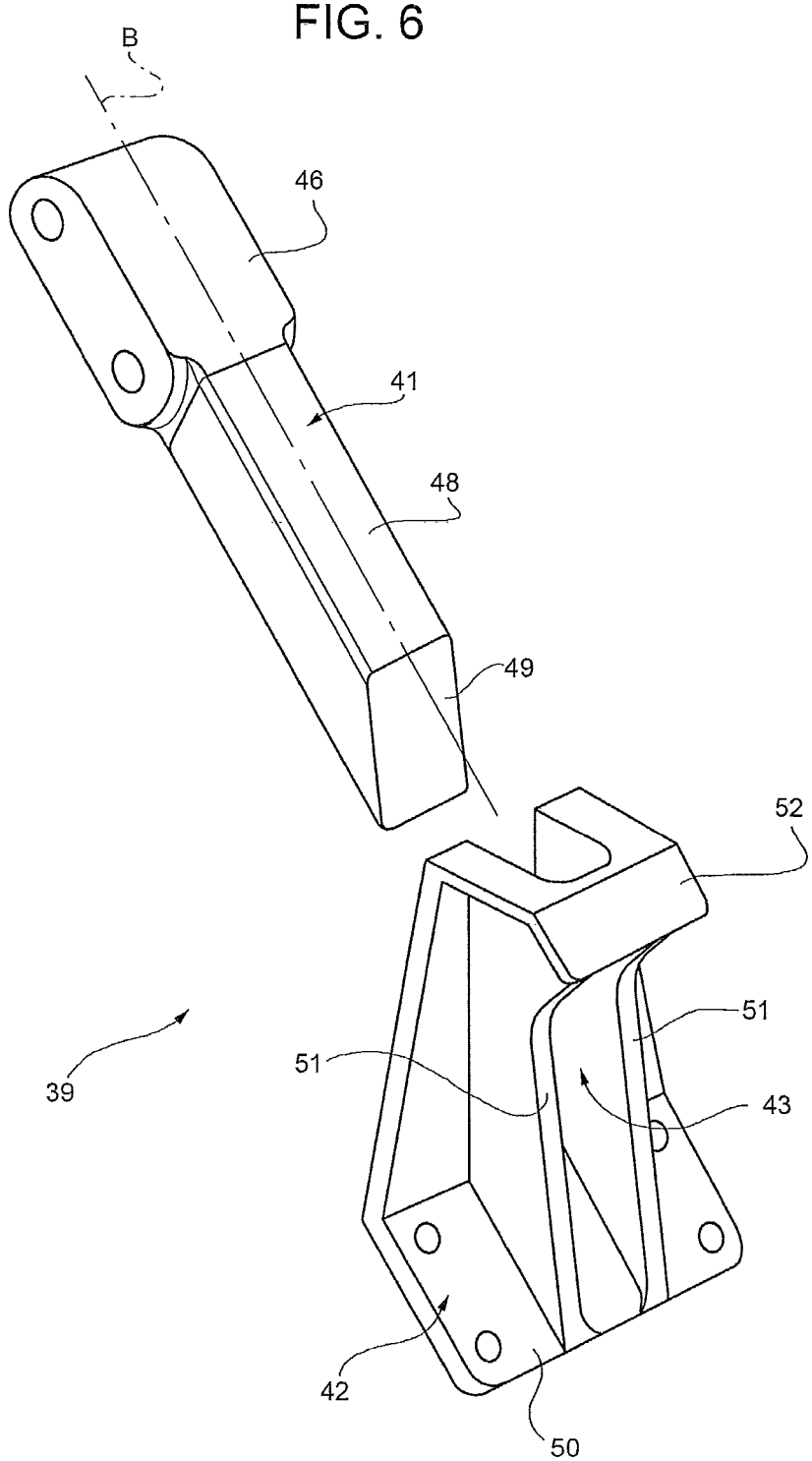
FIG. 6 shows an exploded view in perspective of the FIG. 5 detail.

As shown clearly in FIGS. 4 and 5, direction B allows retaining arm 41 to engage and disengage opening 43 in antirotation bracket 42.

More specifically, retaining arm 41 extends from an axial end 44 of movable member 20, located closer to fuselage 2 of helicopter 1 than the other axial end 45 facing blades 6.

More specifically, retaining arm 41 is located in a predetermined angular position about axis A, and is fixed rigidly at one end 46 to an appendage 47 projecting from the bottom of axial end 44 of movable member 20.

Retaining arm 41 has a parallelepiped-shaped main body 48 elongated in direction B, and terminates with a free end 49 tapered on one side.

Antirotation bracket 42 substantially comprises a base portion 50 fixed to the outer surface of a flared portion of housing 8; and two walls 51 projecting, parallel to each other and to axis A, from base portion 50, and connected to each other, on the opposite side to base portion 50, by a connecting portion 52.

Base portion 50, walls 51, and connecting portion thus define a through opening 43 with a prismatic profile.

As shown clearly in FIGS. 4, 5 and 7, retaining arm 41 engages opening 43 in antirotation bracket 42 loosely in a direction parallel to walls 51 and axis A, so as to slide between walls 51 in a movement parallel to axis A.

Preferably, retaining arm 41 is covered with antifriction material, and the lateral edge of opening in antirotation bracket 42 is surface treated to resist wear.

The way in which rods 33 of actuators 32, oscillating-plate assembly 12, movable member 20, and rods 38 adjust the cyclic and collective pitch of blades of rotor 3 is known and therefore needs no further explanation here.

Needless to say, the so-called 'external control' device 11 described, i.e. located outside housing 8 and drive shaft 5, may easily be replaced, by anyone skilled in the art, with a known so-called 'internal control' cyclic and collective pitch control device (not shown), in which assembly 12 and movable member 20 are mounted to slide on a fixed support inside drive shaft 5.

The advantages of rotor assembly 10 and constraint assembly 40 according to the present invention will be clear from the above description.

In particular, connecting device 39, by comprising only two component parts of simple design (retaining arm 41 and antirotation bracket 42), is much lighter and cheaper than known connecting devices.

The solution according to the present invention involves no hinges, and is much more precise than known compass-type connecting devices, i.e. is a sliding solution with very little slack, which remains unchanged even after many years' service.

Clearly, changes may be made to rotor assembly 10 and constraint assembly 40 as described and illustrated herein without, however, departing from the protective scope of the accompanying Claims.

In particular, rotor assembly 10 and constraint assembly 40 may also be employed to advantage on convertiplanes.

Moreover, constraint assembly 40 may also be used on aircraft landing gears.

The invention claimed is:

1. A rotor assembly (10) for an aircraft (1) capable of hovering, said rotor assembly (10) having an axis (A) and comprising:
   a supporting member (8) coaxial with said axis (A);
   a drive shaft (5) extending coaxially through said supporting member (8) and fitted to the supporting member (8) in an axially fixed position and so as to rotate about said axis (A);
   a movable member (20) mounted so as to be able to translate along and rotate about said axis (A);
   an oscillating-plate assembly (12), which is coaxial with said axis (A), is fitted to said movable member (20) to oscillate with respect to it about transverse axes substantially perpendicular to said axis (A), and in turn comprises a first annular member (13) angularly fixed to said movable member (20), and a second annular member (15) which rotates on said first annular member (13) together with said drive shaft (5);
   supporting and actuating means (23), which cooperate with said first annular member (13) to move said oscillating-plate assembly (12) and said movable member (20) jointly along said axis (A) with respect to said supporting member (8), and to oscillate said oscillating-plate assembly (12) about said transverse axes with respect to said movable member (20); and
   connecting means (39) for connecting said supporting member (8) and said movable member (20), to prevent rotation of said movable member (20) about said axis (A) with respect to said supporting member (8);
   characterized in that said connecting means (39) comprise:
   a retaining arm (41) projecting outwards from one (20) of said supporting member (8) and said movable member (20), and extending at a distance of other than zero from said axis (a); and
   an antirotation bracket (42), which projects from the other (8) of said supporting member (8) and said movable member (20), extends at a distance of other than zero from said axis (A), and defines a through opening (43) engaged in sliding manner by said retaining arm (41).

2. A rotor assembly as claimed in claim 1, wherein said retaining arm (41) fully extends in a longitudinal direction (B) sloping with respect to said axis (A), and slides inside said opening (43) in said antirotation bracket (42) in a movement parallel to said axis (A).

3. A rotor assembly as claimed in claim 2, wherein said longitudinal direction (B) allows said retaining arm (41) to engage and disengage said opening (43) in said antirotation bracket (42).

4. A rotor assembly as claimed in claim 2, wherein said retaining arm (41) engages said opening (43) in said antirotation bracket loosely in a direction parallel to said axis (A).

5. A rotor assembly as claimed in claim 1, wherein said opening (43) has a prismatic profile.

6. A rotor assembly as claimed in claim 1, wherein said antirotation bracket (42) is fixed to said supporting member (8); and said retaining arm (41) is fixed to said movable member (20).

7. A rotor assembly as claimed in claim 6, wherein said retaining arm (41) is fixed rigidly to said movable member (20).

8. A rotor assembly as claimed in claim 1, wherein said retaining arm (41) is covered with antifriction material.

* * * * *